(12) United States Patent
Lane

(10) Patent No.: US 7,051,184 B2
(45) Date of Patent: May 23, 2006

(54) METHOD AND APPARATUS FOR MAPPING MEMORY ADDRESSES TO CORRESPONDING CACHE ENTRIES

(75) Inventor: Robert M. Lane, Dixon, CA (US)

(73) Assignee: SUN Microsystems, Inc., Santa Clara, CA (US)

(*) Notice: Subject to any disclaimer, the term of this patent is extended or adjusted under 35 U.S.C. 154(b) by 441 days.

(21) Appl. No.: 10/455,137

(22) Filed: Jun. 4, 2003

(65) Prior Publication Data
US 2004/0225859 A1    Nov. 11, 2004

Related U.S. Application Data

(60) Provisional application No. 60/468,571, filed on May 6, 2003.

(51) Int. Cl.
*G06F 12/08* (2006.01)
(52) U.S. Cl. .................................. 711/220; 711/118
(58) Field of Classification Search .................. None
See application file for complete search history.

(56) References Cited

U.S. PATENT DOCUMENTS

| | | | |
|---|---|---|---|
| 5,377,340 A | | 12/1994 | Seroussi et al. ............. 395/400 |
| 5,379,393 A | * | 1/1995 | Yang ................................ 711/3 |
| 5,649,143 A | * | 7/1997 | Parady ........................ 711/220 |
| 6,738,890 B1 | * | 5/2004 | Ishikawa et al. ............. 711/220 |
| 2003/0188124 A1 | * | 10/2003 | Luick ............................ 711/214 |

FOREIGN PATENT DOCUMENTS

EP    1 227 405 A2    7/2002

OTHER PUBLICATIONS

"Introducing a New Cache Design into Vector Computers" by Qing Yang, IEEE Transactions on Computers, Dec., 1993, No. 12, New York, pp. 1411-1434, XP 000417776.

* cited by examiner

*Primary Examiner*—Hong Chong Kim
*Assistant Examiner*—Shane M. Thomas
(74) *Attorney, Agent, or Firm*—Park, Vaughan & Fleming, LLP

(57) ABSTRACT

One embodiment of the present invention provides a system for mapping memory addresses to cache entries. The system operates by first receiving a memory request at the cache memory, wherein the memory request includes a memory address. The system then partitions the memory address into a set of word offset bits and a set of higher-order bits. Next, the system maps the memory address to a cache entry by computing a modulo operation on the higher-order bits with respect to an integer and using the result as the cache index.

12 Claims, 5 Drawing Sheets

METHOD AND APPARATUS FOR MAPPING MEMORY ADDRESSES TO CORRESPONDING CACHE ENTRIES

RELATED APPLICATION

This application hereby claims priority under 35 U.S.C. §119 to U.S. Provisional Patent Application No. 60/468,571, filed on 6 May 2003, entitled "Efficient Mapping of Physical Memory to Cache Blocks," by inventor Robert M. Lane.

BACKGROUND

1. Field of the Invention

The present invention relates to the design of cache memories within computer systems. More specifically, the present invention relates to a method and apparatus for mapping memory addresses to corresponding cache entries.

2. Related Art

As processor clock speeds continue to increase at an exponential rate, computer system designers are under increasing pressure to achieve shorter propagation delays through computational circuitry. Unfortunately, computational performance depends on not only processor speed, but also other time-consuming operations. In particular, memory access delays can generate a severe bottleneck as processor speeds reach beyond multiple gigabits per second.

A common technique to alleviate the memory access bottleneck is to store frequently accessed data items in a high-speed cache memory. However, a cache memory cannot be made infinitely large because of chip area and timing constraints. Hence, a computer system's main memory typically needs to be mapped into a much smaller cache memory. When the requested data is found in the cache, a cache hit occurs and much time is saved. Otherwise, a cache miss occurs and the processor stalls to wait for a memory access.

In designing a cache memory, one challenge is to minimize cache misses and to achieve a more uniform cache-access pattern. Cache misses largely depend on application's memory access patterns and on how memory is mapped to the cache. Conventional cache mapping schemes use a portion of the memory address referred to as the "index bits" to directly index cache entries. Hence, memory locations with addresses containing the same index bits are always mapped to the same cache entry (or set of cache entries).

Existing cache mapping schemes are far from perfect. It has been observed that frequently accessed data items are often mapped to the same cache entries, which causes frequent cache line evictions and cache misses. One example is frequently accessed page headers that reside in the first bytes of each page, and which typically get mapped into the same cache entries. Another example is repeating data structures used by trees, hashes, and linked lists, which also tend to be mapped to the same cache entries. As a result, some cache entries suffer more misses than others do. To mitigate the non-uniform distribution of cache misses, a variety of solutions have been attempted: larger block sizes, higher associativity, victim caches, prefetching (hardware and software), and compiler optimizations. However, these solutions each have trade-offs in increased cost and complexity. Great ingenuity, expense, and effort have gone into solving the non-uniform cache miss problem; nevertheless, the results have so far been unsatisfactory.

Hence, what is needed is a method and an apparatus for mapping memory addresses to cache entries in a manner that minimizes cache misses and generates a more uniform distribution of cache-misses.

SUMMARY

One embodiment of the present invention provides a system for mapping memory addresses to cache entries. The system operates by first receiving a memory request at the cache memory, wherein the memory request includes a memory address. The system then partitions the memory address into a set of word offset bits and a set of higher-order bits. Next, the system maps the memory address to a cache entry by performing a modulo operation on the higher-order bits with respect to an integer and using the result as the cache index.

In one embodiment of the present invention, the cache memory can be organized as a direct-mapped cache, a set-associative cache, or a fully-associative cache.

In one embodiment of the present invention, the integer used in the modulo operation is $2^N-1$, wherein N is an integer.

In one embodiment of the present invention, the integer used in the modulo operation is equal to $(2^N-1)$, wherein $2^N$ is equal to the number of sets in the cache memory.

In one embodiment of the present invention, the integer used in the modulo operation is a prime number.

In one embodiment of the present invention, the system calculates the modulo of the higher-order bits of the memory address with respect to $(2^N-1)$ by: dividing the higher-order bits into multiple parts, wherein each part contains at most N bits; adding the parts together to produce a summation; dividing the summation into multiple parts, wherein each part contains at most N bits; producing a new summation by adding the parts together; and repeating the process of dividing the summation and producing a new summation until the new summation is less than or equal to N bits, whereby the resulting summation is the modulo of the higher-order bits with respect to $(2^N-1)$.

In one embodiment of the present invention, the system simplifies the modulo operation of the higher-order bits by: dividing the higher-order bits into multiple parts, wherein each part contains at most N bits; adding the parts together to produce a summation; and using the lower N bits of the summation as the cache index.

In one embodiment of the present invention, the system simplifies the modulo operation of the higher-order bits by: dividing the higher-order bits into multiple parts, wherein each part contains at most N bits; adding only the two lower-order parts together to produce a summation; and using the lower N bits of the summation as the cache index.

Table 1 illustrates a piece of exemplary C code for calculating $(2^N-1)$ modulo in accordance with an embodiment of the presentation.

Table 2 illustrates a piece of exemplary C code for a simplified $(2^N-1)$ modulo operation in accordance with an embodiment of the presentation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
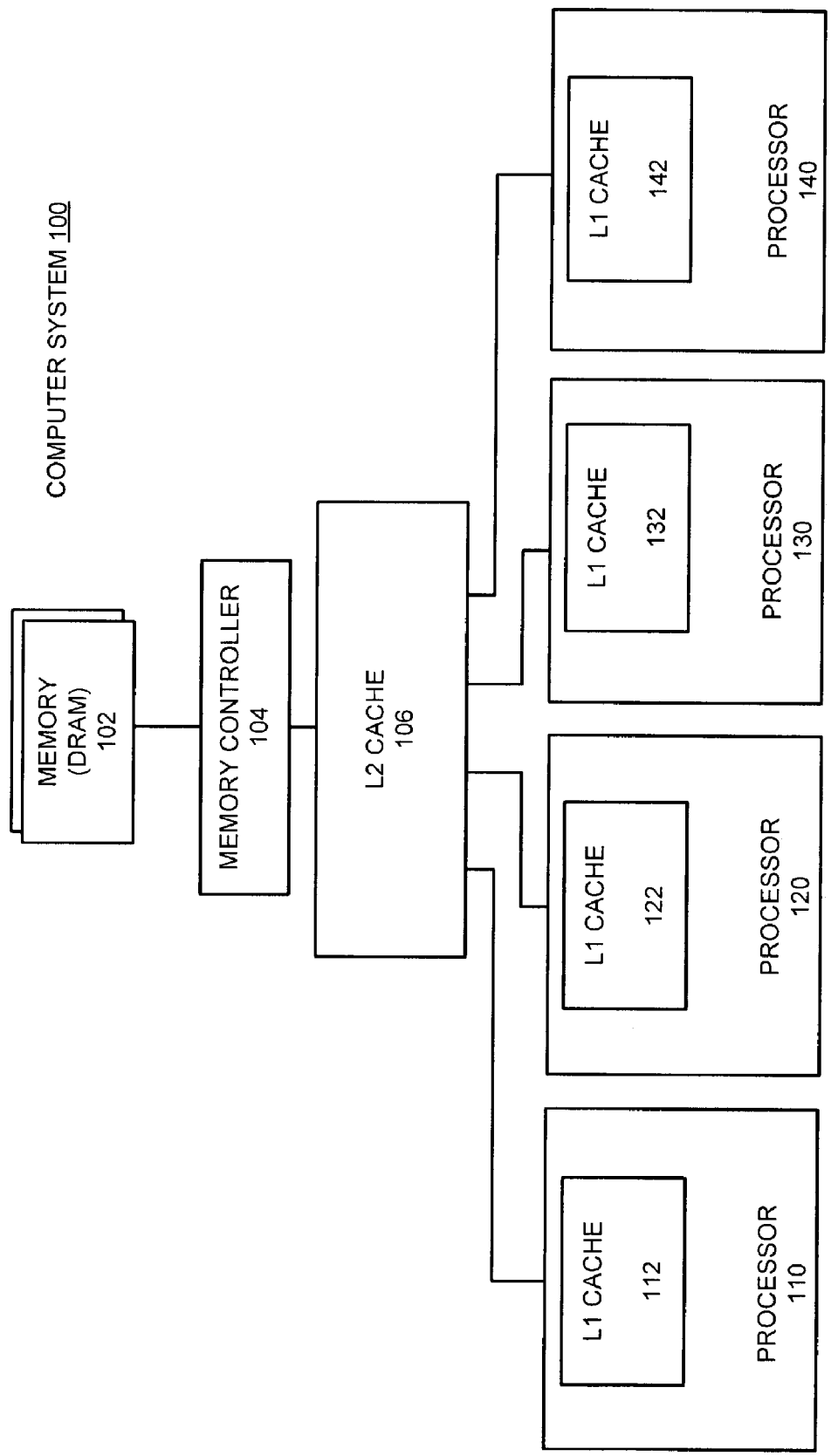
FIG. 1 illustrates a computer system in accordance with an embodiment of the present invention.

FIG. 1 illustrates a computer system in accordance with an embodiment of the present invention. Computer system 100 includes a number of processors 110, 120, 130 and 140, which contain level-one (L1) caches 112, 122, 132 and 142, respectively. Note that the L1 caches 112, 122, 132 and 142 may be separate instruction and data caches, or alternatively, unified instruction/data caches. L1 caches 112, 122, 132 and 142 are coupled to level-two (L2) cache 106. L2 cache 106 is coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data from L2 cache 106 without having to wait for L1 cache 112 to source the data.

Although the present invention is described in the context of a single-chip multiprocessor system, the present invention is not meant to be limited to a multiprocessor system or to a single chip processor. In general, the present invention can be applied to any type of computer system, including a uniprocessor computer system or a multiprocessor computer system. Moreover, the present invention can be applied to almost any type of cache memory, including a set-associative cache, a directed-mapped cache, an instruction cache, a data cache, a unified instruction and data cache, a level one (L1) cache, a level two (L2) cache, or a level three (L3) cache.

Cache Memory

Figure 2:
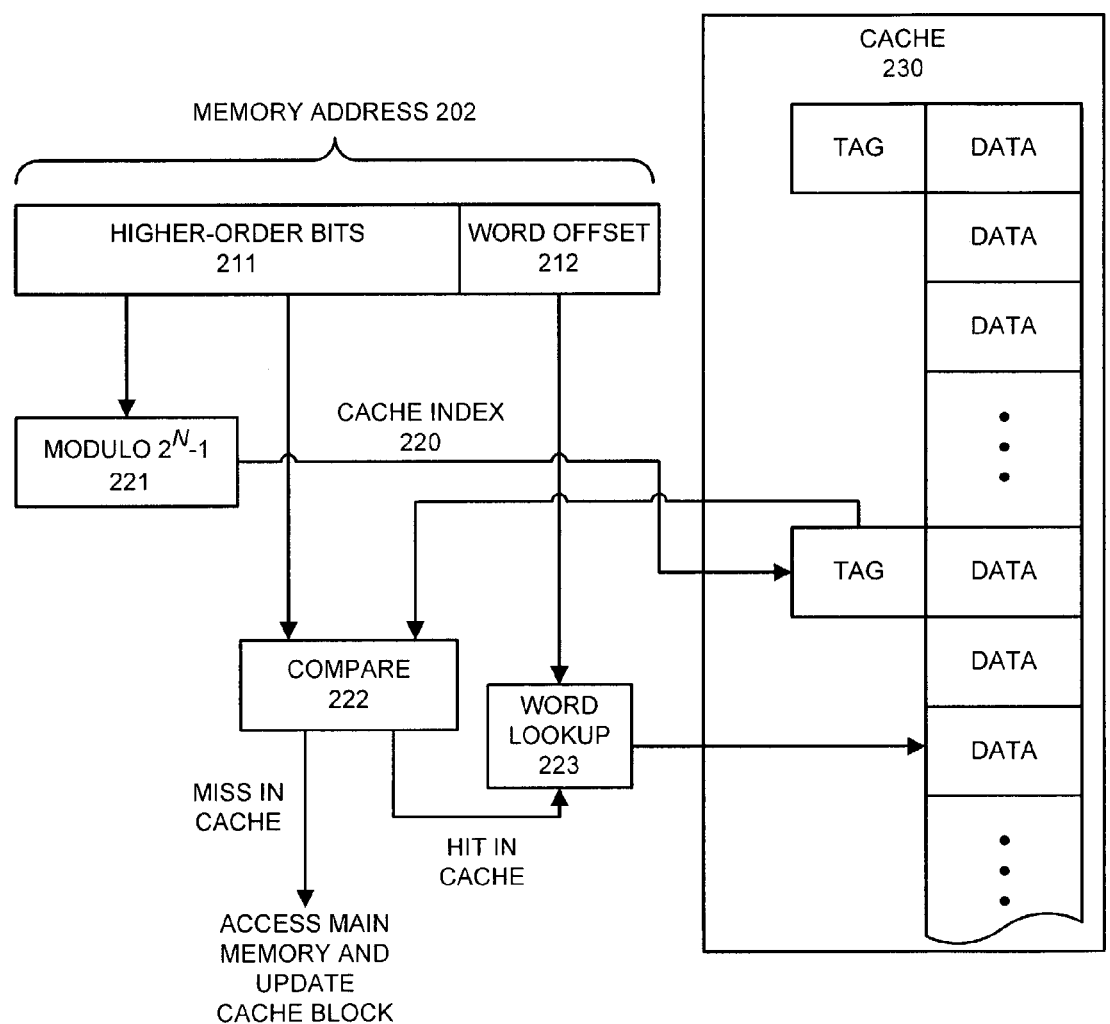
FIG. 2 illustrates a cache memory that supports mapping of memory addresses to cache entries based on a $(2^N-1)$ modulo operation in accordance with an embodiment of the present invention.

FIG. 2 illustrates a cache memory 200 that maps memory addresses to corresponding cache entries based on a $(2^N-1)$ modulo operation in accordance with an embodiment of the present invention.

When a memory request arrives, it contains a memory address 202 that is comprised of word offset bits 212 and higher-order bits 211 bits 211 are sent to $(2^N-1)$ modulo circuit 221. Modulo circuit 221 computes the modulo of the higher-order bits 211 with respect to $(2^N-1)$, wherein $2^N$ equals to the number of cache entries or cache sets in cache 230. Note that $(2^N-1)$ modulo operation ensures that all the physical memory blocks are mapped to the cache memory.

The result of the $(2^N-1)$ modulo operation is then used as a cache index 220 to look up a cache entry in cache 230. The corresponding tag of this cache entry is retrieved and compared with the higher-order bits 211 of the memory address by comparator circuit 222. Comparator circuit 222 determines whether it is a cache miss or a cache hit.

In case of a cache hit, word lookup circuit 223 uses the word offset bits 212 to locate a word within the cache entry. This allows the application to retrieve from or write to the target word in the corresponding cache entry.

In case of a cache miss, a block of data is retrieved from main memory and the corresponding cache entry is updated with the retrieved data.

Although the present invention is described in the context of a direct-mapped cache, the present invention is not meant to be limited to a direct-mapped cache. In general, the present invention can be applied to any type of cache, including a direct-mapped cache, a set-associative cache, and a fully-associative cache.

Process of Mapping Memory Address to Cache Entries

Figure 3:
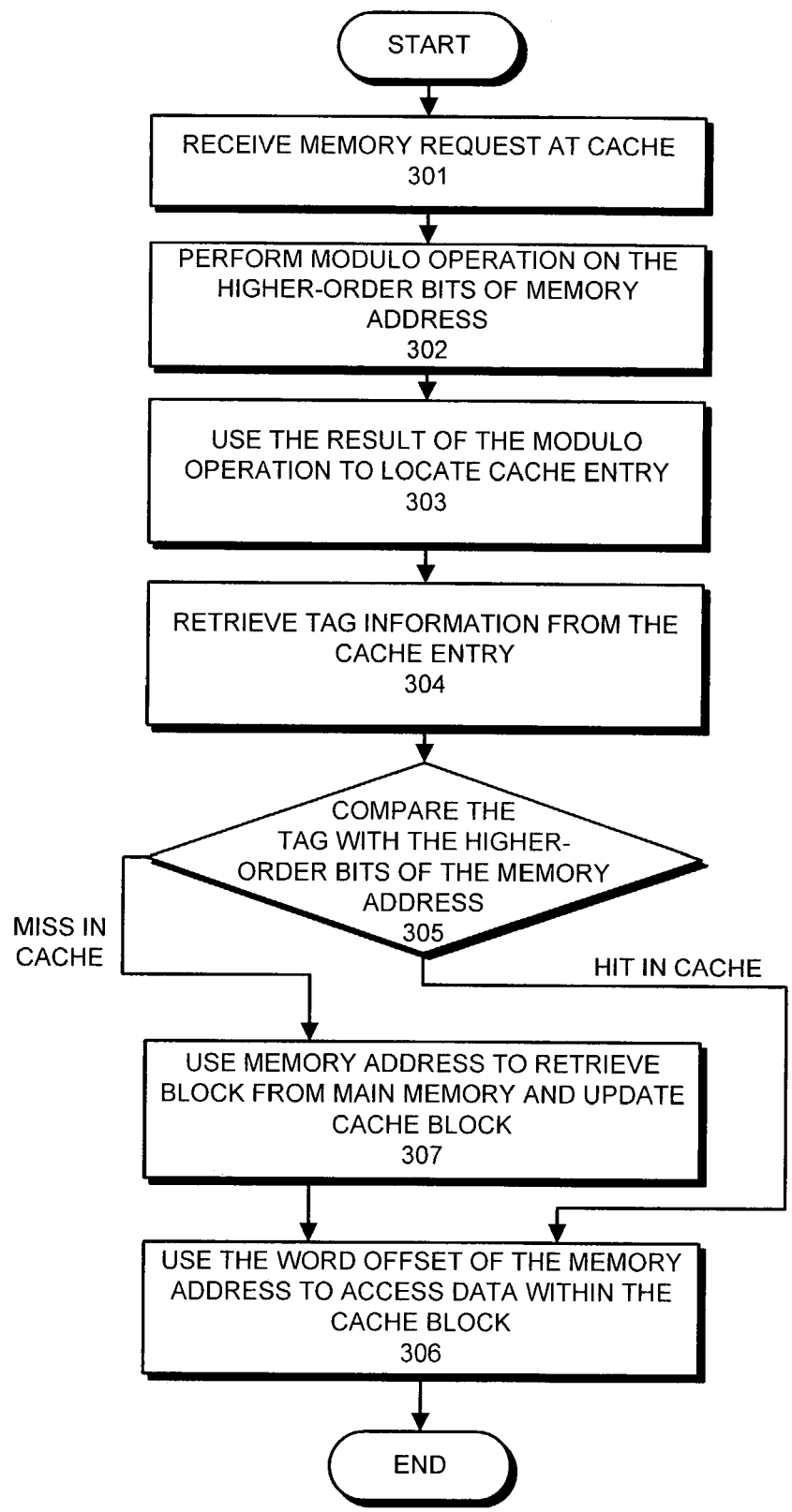
FIG. 3 presents a flow chart illustrating the process of mapping memory addresses to corresponding cache entries in accordance with an embodiment of the present invention.

FIG. 3 presents a flow chart illustrating the process of mapping memory addresses to corresponding cache entries in accordance with an embodiment of the present invention. The system starts when a memory request is received by cache memory 200 (step 301). Upon receiving the memory request, the system performs a modulo operation on the higher-order bits 211 of the memory address in the modulo circuit 221 (step 302). The system then uses result of this modulo operation as cache index 220 to locate the corresponding cache entry (step 303). Next, the system retrieves tag information from the located cache entry (step 304) and compares the tag with higher-order bits 211 of the memory address to determine if the memory request produces a cache hit or a cache miss (step 305).

If the memory request results in a cache hit, the system uses the word offset bits 212 of the memory address to look up the word within the cache entry (step 306). This enables the system to read from or write to the target word in the corresponding cache entry.

If the memory request results in a cache miss, the system uses the memory address to retrieve a block of data from the main memory and to update the corresponding cache entry with the retrieved block (step 307). Next, the system uses the word offset bits 212 of the memory address to look up the word within the cache entry (step 306).

$(2^N-1)$ Modulo Operation

Figure 4:
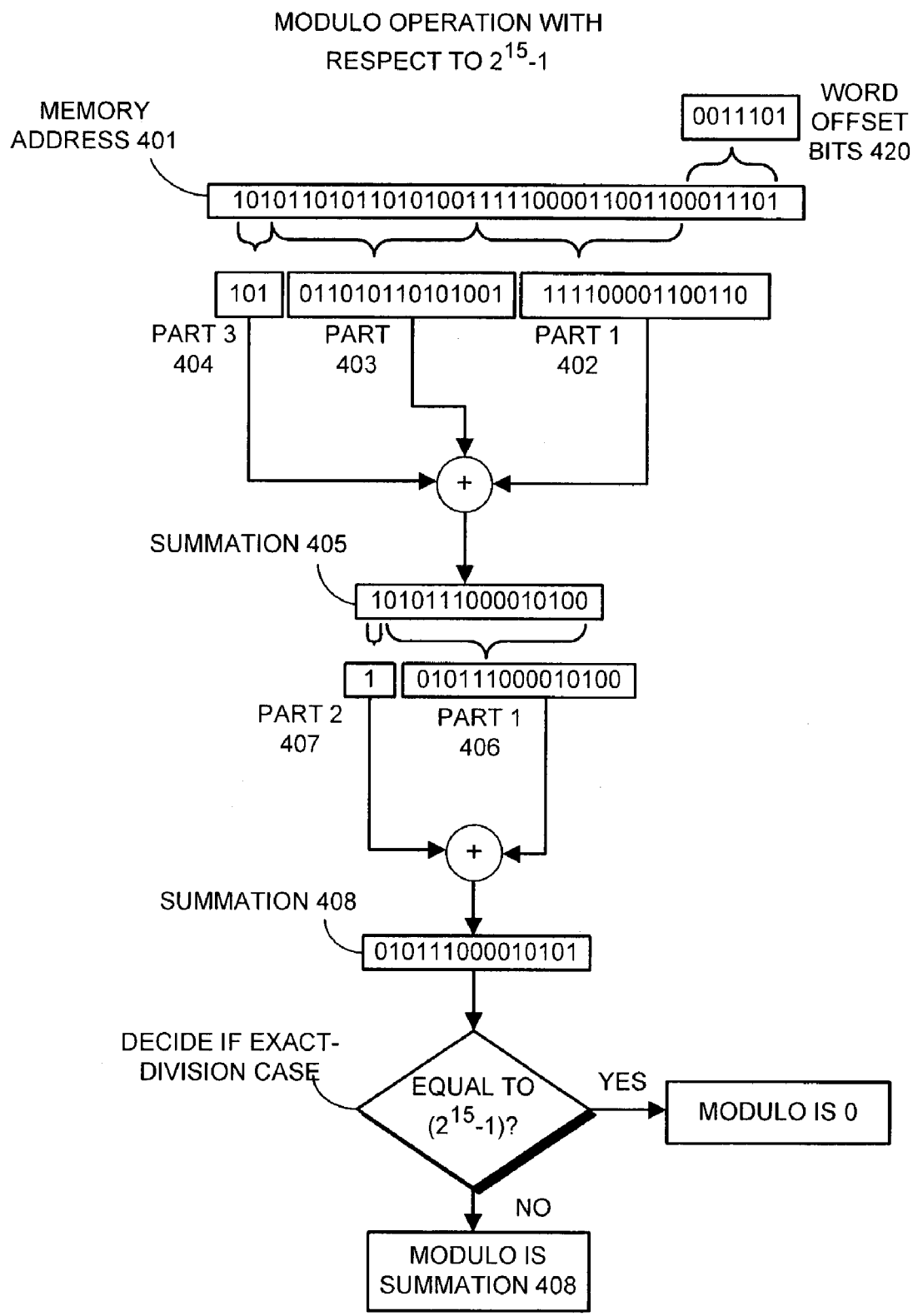
FIG. 4 illustrates an exemplary $(2^N-1)$ modulo operation on a 40-bit-long memory address, wherein there are seven word-offset bits in the memory address and N is equal to 15, in accordance with an embodiment of the present invention.

FIG. 4 illustrates an exemplary $(2^N-1)$ modulo operation on a 40-bit-long memory address, wherein there are seven word-offset bits in the memory address and N is equal to 15, in accordance with an embodiment of the present invention.

When a memory request arrives, it contains a memory address 401 that is comprised of word offset bits 420 and higher-order bits. The higher-order bits are divided into parts 402 and 403, which are 15 bits long, and part 404, which is three bits long. Parts 402, 403, and 404 are then added together to produce a summation 405. Summation 405 is then divided once more into two parts, wherein the first part 406 is 15 bits long and the second part 407 is one bit long. Parts 406 and 407 are added together again to produce summation 408, which is equal to or less than 15 bits long.

Summation 408 is then compared with $(2^{15}-1)$. If summation 408 is equal to $(2^{15}-1)$, the modulo is zero. If summation 408 is not equal to $(2^{15}-1)$, the modulo is summation 408.

Simplified $(2^N-1)$ Modulo Operation

Figure 5:
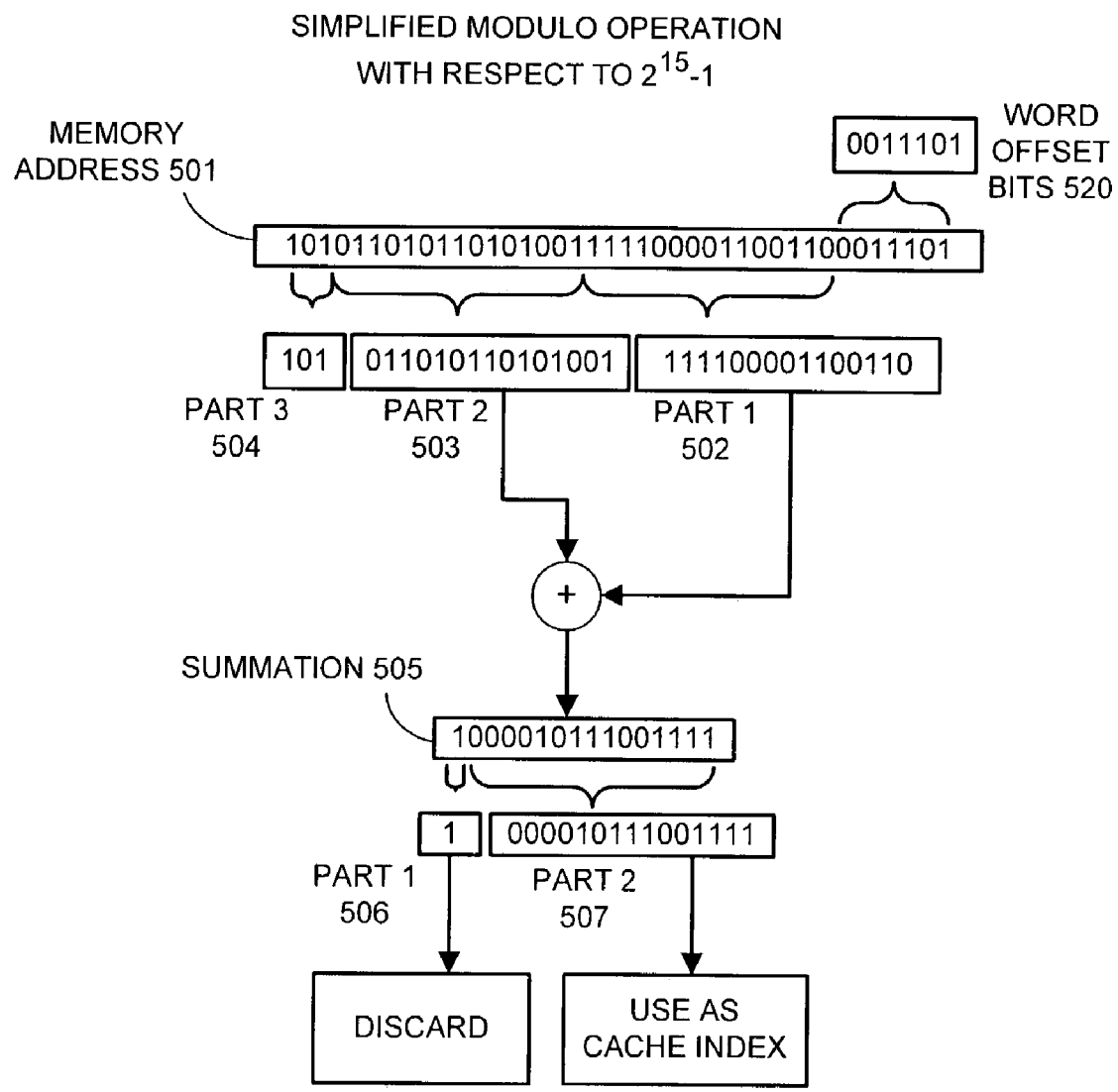
FIG. 5 illustrates an example of a simplified $(2^N-1)$ modulo operation on a 40-bit-long memory address, wherein there are seven word-offset bits in the memory address and N is equal to 15, in accordance with an embodiment of the present invention.

FIG. 5 illustrates an example of a simplified $(2^N-1)$ modulo operation on a 40-bit-long memory address, wherein there are seven word-offset bits in the memory address and N is equal to 15, in accordance with an embodiment of the present invention.

The $(2^N-1)$ modulo operation might require too many processor cycles to use for mapping memory addresses to cache entries. If the test, iteration, and possible carry overflows are ignored, cache mapping is considerably simplified.

When a memory request arrives, it contains a memory address 501 that is comprised of word offset bits 520 and higher-order bits. The higher-order bits are divided into parts 502 and 503, which are 15 bits long, and part 504, which is three bits long. Only parts 502 and 503 are added, and summation 505 is obtained. Next, the higher order bits 506 of summation 505 are discarded, and the lower order 15 bits 507 of summation 505 are directly used as the cache index.

EXAMPLE

Table 1 presents exemplary C code illustrating how the hardware 10 in one embodiment of the present invention calculates the $(2^N-1)$ modulo of the higher-order bits of a memory address for an exemplary 8 MB direct-mapped cache with 64 byte blocks.

TABLE 1

```
#define CACHE_BLOCK_ADDR_BITS    6 /* 2^6 = 64 bytes */
#define CACHE_ENTRIES_MASK       0x1ffff /* 2^17-1 */
#detine CACHE_ENTRY_BITS         17 /* 2^17 = 8 MB */
cacheIndex (paddr)
{ /* assumes 40 bit paddr*/
    paddr=paddr>>CACHE_BLOCK_ADDR_BITS;
    do{
        paddr = (paddr&CACHE_ENTRIES_MASK) +
            ((paddr>>CACHE_ENTRY_BITS)&
            CACHE_ENTRIES_MASK);
    }while(paddr>CACHE_ENTRIES_MASK);
    return paddr==CACHE_ENTRIES_MASK ? 0 : paddr;
}
```

In another embodiment of the present invention, the system can simplify the $(2^N-1)$ modulo operation as is illustrated by the C code shown in Table 2.

TABLE 2

```
#define CACHE_BLOCK_ADDR_BITS    6 /* 2^6 = 64 bytes */
#define CACHE_ENTRIES_MASK       0x1ffff /* 2^17-1 */
#define CACHE_ENTRY_BITS         17 /* 2^17 = 8 MB */
cacheIndex (paddr)
{ /* assumes 40 bit paddr*/
    paddr=paddr>>CACHE_BLOCK_ADDR_BITS;
    paddr = (paddr&CACHE_ENTRIES_MASK) +
        ((paddr>>CACHE_ENTRY_BITS)&
        CACHE_ENTRIES_MASK);
    return paddr==CACHE_ENTRIES_MASK ? 0 : paddr;
}
```

Note that one skilled in the art can easily convert this C code into corresponding hardware structures.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for mapping memory addresses to cache entries within a cache memory, comprising:
   receiving a memory request at the cache memory, wherein the memory request includes a memory address associated with the memory requested;
   partitioning the memory address into word offset bits and higher-order bits; and
   mapping the memory address to a cache entry by computing a modulo of the higher-order bits with respect to an integer and using the result as the cache index, wherein the integer used in the modulo operation is $(2^N-1)$, wherein N is an integer; and
   wherein computing the modulo of the higher-order bits involves:
      dividing the higher-order bits into at least three parts, wherein each part contains at most N bits,
      adding only the two lower-order-bit parts to produce a summation, and
      using the lower order N bits of the summation as the cache index.

2. The method of claim 1, wherein the cache memory can be organized as one of a direct-mapped cache, a set-associative cache, and a fully-associative cache.

3. The method of claim 1, wherein the integer $2^N$ is equal to the number of sets in the cache memory.

4. The method of claim 1, wherein the integer used in the modulo operation is a prime number.

5. An apparatus for mapping memory addresses to cache entries within a cache memory, comprising:
   a cache memory configured to receive a memory request, wherein the memory request includes a memory address associated with the memory requested;
   a partitioning mechanism configured to partition the memory address into word offset bits and higher-order bits; and
   a mapping mechanism configured to map the memory address to a cache entry by computing a modulo of the higher-order bits with respect to an integer and using the result as the cache index, wherein the integer used in the modulo operation is $(2^N-1)$, wherein N is an integer; and
   wherein the mapping mechanism is configured to compute the modulo of the higher-order bits by:
      dividing the higher-order bits into at least three parts, wherein each part contains at most N bits,
      adding only the two lower-order-bit parts to produce a summation, and
      using the lower order N bits of the summation as the cache index.

6. The apparatus of claim 5, wherein the cache memory can be organized as one of a direct-mapped cache, a set-associative cache, and a fully-associative cache.

7. The apparatus of claim 5, wherein the integer $2^N$ is equal to the number of sets in the cache memory.

8. The apparatus of claim 5, wherein the integer used in the modulo operation is a prime number.

9. A computer system containing a mechanism for mapping memory addresses to cache entries within a cache memory, comprising:

a processor;

a memory;

a cache memory configured to receive a memory request, wherein the memory request includes a memory address associated with the memory requested;

a partitioning mechanism configured to partition the memory address into word offset bits and higher-order bits; and a mapping mechanism configured to map the memory address to a cache entry by computing a modulo of the higher-order bits with respect to an integer and using the result as the cache index, wherein the integer used in the modulo operation is ($2^N-1$), wherein N is an integer; and wherein the mapping mechanism is configured to compute the modulo of the higher-order bits by:

dividing the higher-order bits into at least three parts, wherein each part contains at most N bits, adding only the two lower-order-bit parts to produce a summation, and using the lower order N bits of the summation as the cache index.

10. The computer system of claim 9, wherein the cache memory can be organized as one of a direct-mapped cache, a set-associative cache, and a fully-associative cache.

11. The computer system of claim 9, wherein the integer $2^N$ is equal to the number of sets in the cache memory.

12. The computer system of claim 9, wherein the integer used in the modulo operation is a prime number.

* * * * *